(12) United States Patent
Koprubasi

(10) Patent No.: US 8,392,043 B2
(45) Date of Patent: Mar. 5, 2013

(54) POWERTRAIN FOR AN ELECTRIC VEHICLE AND METHOD OF MANAGING ELECTRIC POWER FLOW IN A VEHICLE POWERTRAIN

(75) Inventor: Kerem Koprubasi, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 13/048,987

(22) Filed: Mar. 16, 2011

(65) Prior Publication Data
US 2012/0239233 A1    Sep. 20, 2012

(51) Int. Cl.
*B60L 15/00* (2006.01)
(52) U.S. Cl. .......................................... 701/22
(58) Field of Classification Search ........................ None
See application file for complete search history.

Primary Examiner — Thomas Tarcza
Assistant Examiner — Adam Alharbi
(74) Attorney, Agent, or Firm — Quinn Law Group, PLLC

(57) ABSTRACT

A method of managing electric power flow in a vehicle powertrain includes recording operator input indicative of a current request for electric power. An amount of the currently requested electric power corresponding with the recorded operator input is determined. This amount is averaged with amounts of requested electric power based on previously recorded operator input recorded over time. An amount of electric power required from an auxiliary power unit to satisfy the current request for electric power is determined based at least in part on the averaged requested electric power for propulsion. A powertrain has an electric motor/generator, a battery operable to provide electric power to the electric motor/generator, and an auxiliary power unit operable to supplement the battery. The auxiliary power unit includes an engine and a generator. A processor with a stored algorithm carries out the method.

15 Claims, 2 Drawing Sheets

US 8,392,043 B2

POWERTRAIN FOR AN ELECTRIC VEHICLE AND METHOD OF MANAGING ELECTRIC POWER FLOW IN A VEHICLE POWERTRAIN

TECHNICAL FIELD

The invention relates to a method of managing electric power flow in a vehicle powertrain.

BACKGROUND

Electric vehicles typically have an electric motor/generator that provides electric power to an output member that is mechanically connected to vehicle wheels through a drive train to propel the vehicle. Some electric vehicles include an auxiliary power unit (APU) that generates electric power to supplement power provided by a battery. The APU may include an engine, such as an internal combustion engine, that powers a generator that generates electric power. In order to limit emissions and increase fuel economy, the APU is typically used only as needed, with the battery serving as the primary source of electric power. One known control method is thermostatic control (also referred to as "bang-bang" control), in which the APU is turned on and off depending upon the battery charge level, and provides a fixed power level that provides a high energy conversion efficiency. During lightly-loaded driving cycles, this control strategy may result in relatively frequent engine on-off events, and potentially, a corresponding increase in emissions. Another control method is referred to as a "load-following" method, as the power provided by the APU follows the total power demand from the vehicle operator and auxiliary loads. Because the APU is not necessarily operating within a desired efficiency range under this method, this method is typically used only when the buffer of available battery energy is relatively small, and would not be a preferred method for a battery electric vehicle with large energy storage capability.

SUMMARY

A method of managing electric power flow in a vehicle powertrain is provided that avoids engine on-off busyness associated with bang-bang control methods, while still allowing the APU to operate within its most efficient range. The method is for a powertrain that has an electric motor/generator operatively connected to an output member to provide tractive torque for propelling the vehicle, a battery operable to provide electric power to the electric motor/generator, and an APU operable to provide electric power to the electric motor/generator. The APU includes an engine, such as an internal combustion engine, and a generator powered by the engine. The method is carried out by a controller according to a stored algorithm.

The method includes recording operator input indicative of a current request for electric power for propulsion. An amount of the currently requested electric power for propulsion ($P_{REQ}$) corresponding with the recorded operator input is then determined. This amount is then averaged with predetermined amounts of requested electric power based on previously recorded operator input recorded over time. An amount of electric power required from the auxiliary power unit ($P_{APU,NOM}$) to satisfy the current request for electric power is then determined based at least in part on the averaged requested electric power for propulsion. The previous requests may be weighted, with those most recent given greater weight. The battery state-of-charge may be considered, and the time interval over which previous requests for electric power are considered may be shortened as the state-of-charge decreases. The amount of electric power actually provided by the APU may be different from the amount determined to be required. For example, limits may be placed on the power that can be provided by the auxiliary power unit in order to satisfy predetermined efficiency, noise and vibration requirements. If energy shortage in the battery is too high, the efficiency limits may be raised or not applied.

By averaging the current power request with previous power requests, fast load transients are avoided, engine start/stop events are decreased, and high efficiency, quasi-steady state engine power is provided. The method accounts for the state-of-charge of the battery by making efficiency determinations secondary to maintaining an adequate state-of-charge of the battery. The method requires only a relatively small number of calibration parameters (e.g., the physical and efficiency parameters of the engine, the motor/generator, and the generator) to determine power request from the operator input, and knowledge or prediction of future driving conditions is not necessary.

A powertrain that has an output member, an electric motor/generator operatively connected to the output member to provide power to the output member for propelling the vehicle, and a battery operable to provide electric power to the electric motor/generator. An auxiliary power unit operable to supplement the battery by providing electric power to the electric motor/generator is also provided. The auxiliary power unit includes an internal combustion engine and a generator powered by the internal combustion engine. A processor with a stored algorithm that carries out the method is included.

The above features and advantages and other features and advantages of the present invention are readily apparent from the following detailed description of the best modes for carrying out the invention when taken in connection with the accompanying drawings.

DETAILED DESCRIPTION

Figure 1:
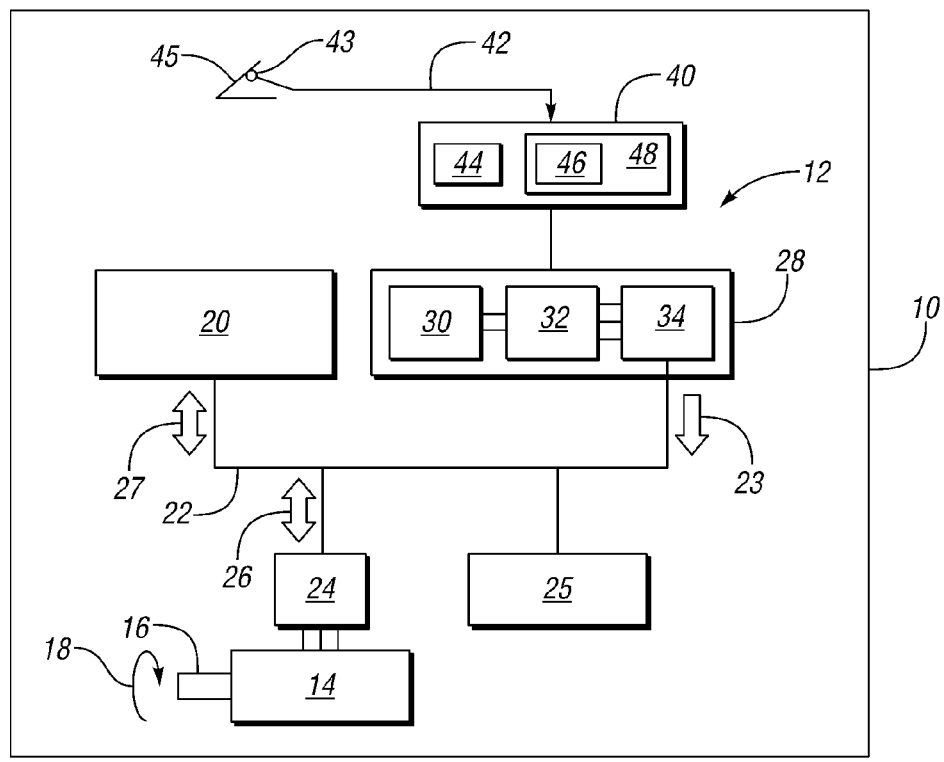
FIG. 1 is a schematic illustration of a powertrain having a battery and an auxiliary power unit that provide electrical power to an electric motor/generator that powers an output member.

Referring to the drawings, wherein like reference numbers refer to like components throughout the several views, FIG. 1 shows a vehicle 10 that includes a powertrain 12. The powertrain 12 includes an electric motor/generator 14 that powers an output member 16 that provides tractive torque to the wheels (not shown), with the torque represented by arrow 18. The electric motor/generator 14 receives electric power from a high voltage battery 20. The electric power is delivered along a high voltage electrical bus 22 and is converted from direct current to alternating current by a power inverter 24 in order to power the electric motor/generator 14. The battery 20 also delivers electric power to other vehicle components 25 that create electric loads, such as vehicle accessories. As indicated by double-sided arrows 26 and 27, the electric motor/generator 14 can function as a generator, such as during vehicle braking, to convert mechanical energy at the output member 16 into electrical energy for charging the battery 20.

The vehicle 10 may be considered a battery electric vehicle or an electric hybrid vehicle as the battery 20 is designed to provide adequate power to the output member 16 and the other vehicle components 24 under a wide range of vehicle operating conditions. An auxiliary power unit (APU) 28 is provided that is able to generate additional electric power indicated by arrow 23 to the electric bus 22 when needed to supplement power provided by the battery 20. The APU 28 includes a relatively small internal combustion engine 30, such as a two-cylinder engine, although the APU 28 is not limited to such an engine. The engine 30 powers a generator 32 to create electric power. The APU 28 may be designed to provide a peak power that satisfies the average power requirements of a given driving cycle, by way of non-limiting example, a driving cycle that requires a 10-20 kW range from the APU 28.

Another power inverter 34 converts alternating current produced by the generator 32 into direct current to be provided along the high voltage electric bus 22 to the power inverter 24 and then to the electric motor/generator 14. The APU 28 can also directly charge the battery 20 if needed. The APU 28 is connected to the output member 16 only through the electric bus 22, the power inverter 24 and the electric motor/generator 14. In this embodiment of the powertrain 12, there are no mechanical connections between the APU 28 and the output member 16; that is the APU 28 is mechanically decoupled from the output member 16 and from a final drive or drivetrain connected to the output member 16. An APU 28 configured in this manner is sometimes referred to as a vehicle range extender, and the vehicle may be referred to as a battery electric vehicle.

In order to limit use of the engine 30 to reduce fuel consumption and emissions, power from the APU 28 is generally used only as necessary to supplement power provided by the battery 20 to meet power requested by a vehicle operator. A controller 40 is configured to ensure that operator power demands are met. Specifically, the controller 40 is operatively connected to the battery 20 and the APU 28, and receives operator input 42 indicative of a current request for electrical power at the bus 22 to be provided to the electric motor/generator 14 to create mechanical power at the output member 16 for propelling the vehicle. The input data 42 may be provided by a sensor 43 on a vehicle accelerator 45 or the like. The input data 42 is stored in internal memory 44 of the controller 40 so that historical requests for power at the output member 16 may be stored and tracked. The input data 42, along with information provided to the controller 40 from the battery 20, such as a state-of-charge of the battery, and information regarding the efficiency of the internal combustion engine 30 and other vehicle operating parameters are provided to the controller 40. A processor 46 of the controller 40 carries out a stored algorithm 48 in order to manage the power provided by the APU 28 in a manner that accounts for previous operator power requests and the state-of-charge of the battery 20.

Figure 2:
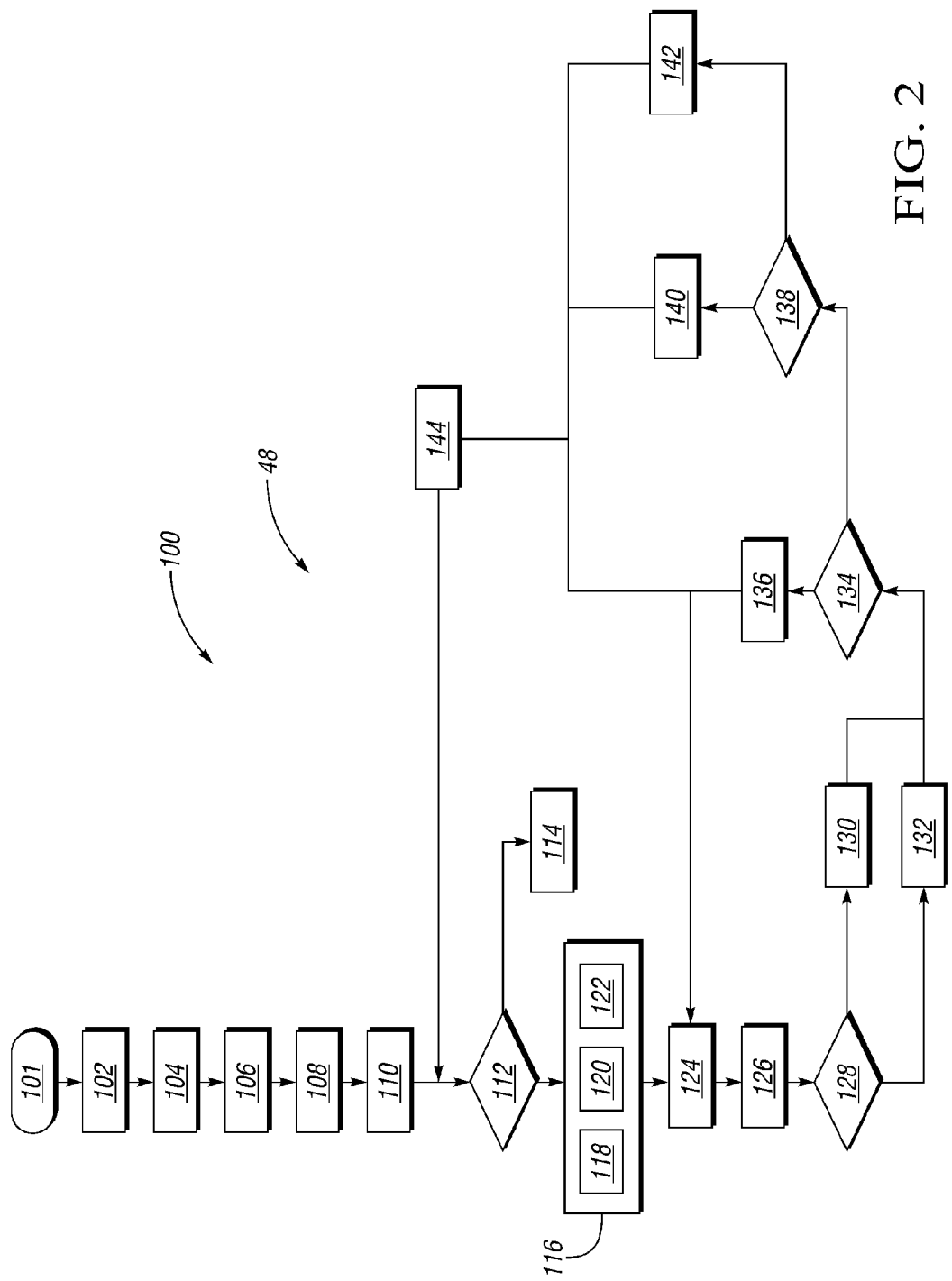
FIG. 2 is a flow diagram illustrating a method of managing electric power flow in the powertrain of FIG. 1.

Specifically, a method 100 of managing electric power flow in the vehicle powertrain 12 that includes the algorithm 48 is shown as a flow diagram in FIG. 2. The method 100 begins at block 101, such as when the vehicle 10 is powered on. In block 102, operator input 42 indicative of the amount of electrical power currently requested at the bus 22 for propulsion of the vehicle 10 at the output member 16 is recorded in the memory 44. The memory 44 stores a series of such operator inputs 42 as the vehicle 10 is running.

One method of computing the electric propulsion power request $P_{req}$ at the high voltage DC bus 22 is set forth below. However, any known method of calculating the electric propulsion power request $P_{req}$ may be used, and the remainder of the algorithm 48 would still apply. For example, the electric propulsion power request $P_{req}$ could be calculated using a stored look-up table that correlates an acceleration request $a_{req}$ with an electric propulsion power request $P_{req}$. Under the method set forth herein, the electric propulsion power request $P_{req}$ is computed from the operator's acceleration request $a_{req}$. The acceleration request $a_{req}$, is converted to a torque request at the vehicle wheels. $T_{req,wh}$ and a power request at the motor output $P_{req,EM-out}$. From this, the electrical propulsion power request $P_{req}$ can be computed. As indicated below, these computations are based on the physical characteristics of the vehicle 10, the efficiency of the motor/generator 14, the efficiency of the final drive of the vehicle 10, the efficiency of the battery 20, and the efficiency of the power inverter 24. All of these factors are relatively fixed, and the formulas for converting the acceleration request $a_{req}$ into an electrical propulsion power request $P_{req}$ are stored in the processor 46. For example, the operator's acceleration request $a_{req}$ is a function of vehicle speed v and the accelerator position pps. From the acceleration request $a_{req}$, a corresponding torque request at the wheels $T_{req,wh}$ may be computed as follows:

$$T_{req,wh} = T_{inertia} + T_{aero} + T_{roll}$$

where $$T_{inertia} = \left(M * R + \frac{J}{R}\right) * a_{req};$$

where M is vehicle mass, R is tire radius, J is the combined inertia of the wheel assembly (including rotating driveline components);

where $$T_{aero} = \frac{1}{2} \rho * C_d * A * v^2 * R;$$

where $\rho$ is air density, $C_d$ is drag coefficient, A is frontal area of the vehicle, and v is vehicle speed;

where $T_{roll} = M * g * (C_{rr,1} + C_{rr,2} * v) * R$; where $C_{rr,1}$ and $C_{rr,2}$ are rolling resistance coefficients.

From the computations of the torque request at the wheels, $T_{req,wh}$, the power request at the motor output, $P_{req,EM-out}$, is computed as follows:

$$P_{req,EM-out} = \omega_{EM} * X * T_{req,wh} \text{ when } T_{req,wh} > 0;$$

and $$P_{req,EM-out} = \omega_{EM} * Y * T_{req,wh} \text{ when } T_{req,wh} < 0;$$

where X is $1/(\eta_{FD} * \eta_{EM,gb} * Y_{FD} * Y_{EM,gb})$, and Y is $(\eta_{FD} * \eta_{EM,gb})/(Y_{FD} * Y_{EM,gb})$, $\omega_{EM}$ is the angular speed of the electric motor/generator 14 and is set to a predetermined minimum value when it is close to zero to avoid calculations of power requests and motor efficiency as zero when the vehicle 10 is stationary, $\eta_{FD}$ is the efficiency of the final drive between the output member 16 and the vehicle wheels, $\eta_{EM,gb}$ is the efficiency of a gear box in the electric motor/generator 14, $Y_{FD}$ is the gear ratio of the final drive, and $Y_{EM,gb}$ is the gear ratio of a gear box in the electric motor/generator 14.

The electrical propulsion power request $P_{req}$ at the high voltage DC bus 22 is then computed from the following equation:

$$P_{req} = 1/(\eta_{EM,inv} * \eta_{EM,mtr} * \eta_{BATT}) * P_{req,EM-out} \text{ when } P_{req,EM-out} > 0;$$

and $$P_{req} = (\eta_{EM,inv} * \eta_{EM,mtr} * \eta_{BATT}) * P_{req,EM-out} \text{ when } P_{req,EM-out} < 0$$

where $\eta_{EM,inv}$ is the efficiency of the inverter 24, $\eta_{EM,mtr}$ is the efficiency of the electric motor/generator 14, $\eta_{BATT}$ is the efficiency of the battery 20. Again, $\omega_{EM}$ may be set to a predetermined minimum value when actually close to zero to avoid $\eta_{EM,inv}$, $\eta_{EM,mtr}$ or $P_{req,EM-out}$ being equal to zero.

Accordingly, using the above torque and power relationships, the electric propulsion power request $P_{req}$ at the bus 22 is calculated from the operator input 42 (i.e., the driver's acceleration request $a_{req}$). In addition to tractive loads, vehicle accessory loads are also considered in calculating the state-of-charge of the battery 20. $P_{req}$ is the total electric power requested at the bus 22 to be provided by the battery 20 and/or the APU 28 depending on the remaining determinations of the method 100 described herein. The algorithm, 48 determines the portion of the power request $P_{req}$ that is to be provided by the APU 28 given efficiency, noise and drivability considerations (e.g., eliminating frequent engine start/stop considerations) and the state-of-charge of the battery 20.

Figure 3:
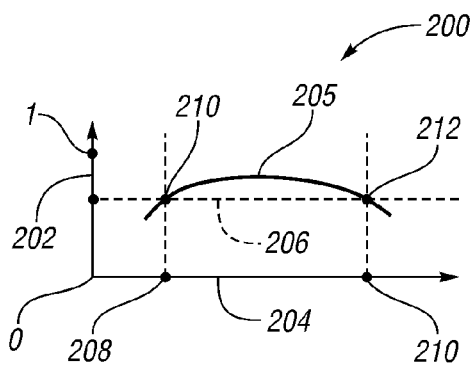
FIG. 3 is a plot illustrating a relationship between efficiency of the auxiliary power unit and power provided by the auxiliary power unit.

In block 104, a relationship between the efficiency of the APU 28 and power provided by the APU 28 is established so that upper and lower limits on power from the APU 28 to achieve a predetermined minimum acceptable efficiency are known. These limits are based on a combination of thermal efficiency of the engine 30 and power losses in the generator 32 and the inverter 34. These factors vary with the speed and torque output of the engine 30 and the generator 32. Referring to FIG. 3, a plot 200 shows the efficiency 202 of the APU 28 on the vertical axis, ranging from 0 to 1, versus power 204 provided by the APU 28 (in kilowatts) on the horizontal axis. Dynamometer testing or theoretical analysis of the APU 28 yields a curve 205 indicating the power provided by the APU 28 in kilowatts from which a minimum power 208, also referred to as $P_{APU,MIN-EFF}$ and a maximum power 210, also referred to as $P_{APU,max}$ can be selected that meet a minimum efficiency goal 206.

Figure 4:
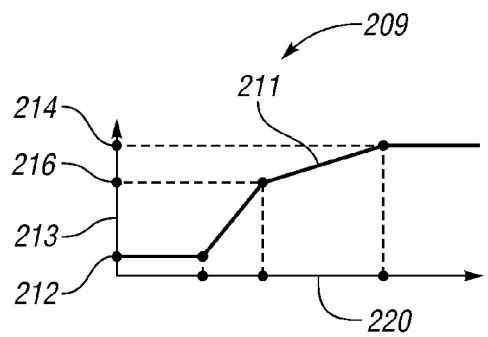
FIG. 4 is a plot illustrating a relationship between selected maximum power levels provided by the auxiliary power unit and an amount of energy depleted from the battery.

Referring to FIG. 4, a plot 209 of power in kilowatts versus a degree of energy shortage is shown. An absolute peak power 214 of the APU 28 and a power 216 that corresponds with acceptable noise levels are determined by testing. In box 106, a relationship 211 shown in FIG. 4 is established between power 213 available from the APU 28 on the vertical axis of FIG. 4, such as the various efficiency-limited peak power 212, noise-limited peak power 216 and absolute peak power 214, and a degree of energy shortage in the battery 20 indicated on the horizontal axis 220 in FIG. 4. As indicated in FIG. 4, as the energy shortage in the battery 20 increases, efficiency and noise limitations of the APU 28 are relaxed in favor of operating the APU 28 at its peak power. The shape of the curve in FIG. 4 is exemplary only and may take any desired form based on calibration requirements. This information is stored in the memory 44 of the controller 40.

With the predetermined physical and efficiency information stored in the controller 40, the method 100 can carry out the algorithm 48 based on current vehicle operating conditions. In step 108, a current state-of-charge SOC of the battery 20 is determined such as from an algorithm that combines measurements such as current, voltage and temperature with battery models to estimate the state-of-charge SOC of the battery 20. The state-of-charge SOC of the battery 20 is provided to the controller 40. Based on the stored relationship between the operator input 42 and the power requested at the high voltage bus 22, the algorithm calculates the current power requested $P_{req}$ in block 110. The state-of-charge SOC of the battery 20 determined in block 108 is then compared to a predetermined minimum state-of-charge $SOC_{MIN}$ in block 112. If the state-of-charge SOC of the battery 20 is greater than or equal to the $SOC_{MIN}$ then there is sufficient charge for the battery 20 to meet the requested power $P_{req}$ at the bus 22, and in block 114, the controller 40 directs the requested power $P_{req}$ from the battery 20 to the bus 22 for powering the electric motor/generator 14.

However, if in block 112 it is determined that the state-of-charge SOC of the battery 20 is less than the minimum state-of-charge $SOC_{MIN}$, then in block 116, the algorithm 48 determines the electric power that would be required from the APU 28, also referred to as the nominal APU power, $P_{APU,NOM}$, based at least in part on an average of requested electric power for propulsion (i.e., an average of the power requests indicated by the operator input 42) to meet the current requested power. This determination includes averaging past power requests $P_{req}$ in block 118. Specifically, the nominal APU power $P_{APU,NOM}$ is calculated as follows:

$$P_{APU,NOM} = \frac{1}{\sum_{i=0}^{N} w_i} \cdot \sum_{i=0}^{N} w_i \cdot Preq(t - i\Delta T)$$

where N is the number of past power requests $P_{req}$ at the electrical bus 22 based on corresponding past operator input 42, $w_i$ is a respective weighting factor applied to the respective past power requests $P_{req}$. The processor 46 may be configured so that in block 120 the weighting factor $w_i$ applied to the respective previous power request decreases as the period of time since the respective power request occurred increases, so that the nominal APU power $P_{APU,NOM}$ is more representative of more recent requests.

The power requests that are averaged are taken over a predetermined averaging interval $N\Delta T$. The processor 46 may be configured so that in block 122, the averaging interval $N\Delta T$ may be based on the state-of-charge SOC of the battery 20. That is, the number N of previous power requests $P_{req}$ considered may decrease as the state-of-charge SOC of the battery decreases so that the nominal APU power $P_{APU,NOM}$ is more closely related to the most current power request when the state-of-charge SOC is low.

Next, in block 124, the algorithm 48 accounts for the amount of energy depleted from the battery 20, $E_{BATT,short}$, by summing the differences between an amount of electric power actually provided by the APU 28 to the electric bus 22 $P_{APU,ACT}$ and the amount of power requested $P_{req}$ at the electric bus 22 for each operator input 42 recorded at different times up to the current time T, as follows:

$$E_{BATT,short} = \int_{t=0}^{T} (P_{APU,act} - P_{req}) dt$$

When the amount of energy depleted from the battery $E_{BATT,short}$ is known from block 124, in block 126 the relationship established in block 106 between power limits to be applied to the APU 28 and a degree of energy shortage in the battery 20 is used to select an effective peak power $P_{APU,EPL}$, not less than the efficiency-limited peak power 212, and not greater than the absolute peak power 214.

Figure 5:
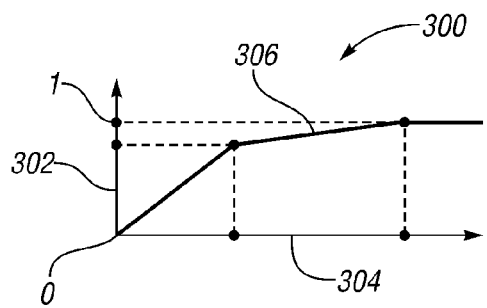
FIG. 5 is a plot illustrating a relationship between a correction factor applied to the power requested from the auxiliary power unit and an amount of energy depleted from the battery.

In block 128, the electric power required from the APU 28, $P_{APU,NOM}$ is compared to the effective peak power $P_{APU,EPL}$ selected in block 126. From this comparison, a corrected power level $P_{APU,corr}$ is established in either block 130 or block 132. Specifically, if the electric power required from the APU 28, $P_{APU,NOM}$, is greater than the effective peak power available from the APU 28, $P_{APU,EPL}$, then the selected effective peak power available from the APU 28, $P_{APU,EPL}$, is established as the corrected power level $P_{APU,corr}$ in block 130. If, however, the electric power required from the APU 28, $P_{APU,NOM}$, is less than or equal to the effective peak power available from the APU 28, $P_{APU,EPL}$, then the corrected power level $P_{APU,corr}$ is an amount of power from the APU 28 sufficient to provide both the electric power required from the APU 28, $P_{APU,NOM}$, and a predetermined amount of power for recharging the battery 20. The predetermined amount for recharging the battery 20 is equal to the difference between the effective power available from the APU 28, $P_{APU,EPL}$, and the electric power required from the APU 28, $P_{APU,NOM}$, multiplied by a correction factor $K_{corr}$ that is between a number between zero and one. FIG. 5 shows a plot 300 of the correction factor $K_{corr}$ ranging from zero to one on the vertical axis 302 versus the energy shortage in the battery 20 on the horizontal axis 304. As the energy shortage 304 in the battery 20 increases, the corresponding correction factor $K_{corr}$ increases to one, as indicated by correction function 306. As the correction factor $K_{corr}$ increases, the amount of power provided from the APU 28 that is used to recharge the battery 20 increases. The correction function 306 may take different forms and what is shown in FIG. 5 is only exemplary. Using the correction factor $K_{corr}$ to update the electric power required from the APU 28, $P_{APU,NOM}$, is similar in nature to using proportional control for battery energy management. It is also possible to use other correction methods such as proportional-integral or proportional-integral-derivative control to improve battery energy management if necessary.

Once the corrected power level $P_{APU,corr}$ is selected in block 130 or 132, the algorithm 48 compares the corrected power level $P_{APU,corr}$ to the predetermined efficiency-based power level $P_{APU\,MIN\text{-}EFF}$ in block 134. If the corrected power level $P_{APU,corr}$ is not less than (i.e., is greater than or equal to) the predetermined efficiency-based power level $P_{APU\,MIN\text{-}EFF}$, then in block 136 the controller provides electric power $P_{APU,ACT}$ to the bus 22 and therefore to the electric motor/generator 14 from the APU 28 equal to the corrected power level $P_{APU,corr}$. However, if the corrected power level $P_{APU,corr}$ is less than the predetermined efficiency-based power level $P_{APU\,MIN\text{-}EFF}$, then in block 138 the algorithm 48 compares the amount of energy depleted from the battery $E_{BATT,short}$ to a predetermined amount of energy $E_{1,threshold}$. If the amount of energy depleted from the battery $E_{BATT,short}$ is greater than the predetermined amount of energy $E_{1,threshold}$, then the algorithm 48 determines in block 140 that supplemental power must be supplied by the APU 28, and provides the predetermined efficiency based power level $P_{APU\,MIN\text{-}EFF}$ to the electric bus 22 and thus to the electric motor/generator 14 and the output member 16 to meet operator demand. If the amount of energy depleted from the battery $E_{BATT,short}$ is not greater than the predetermined amount of energy $E_{1,threshold}$, then the algorithm 48 determines in block 142 that the battery 20 has sufficient power to meet the requested power, and no power is provided to the electric bus 22 from the APU 28. In order to implement the logic condition in block 138, it is preferable to use a function that exhibits hysteresis property to avoid rapid sign changes at the output. Using such a function would prevent potential discontinuities in electric power $P_{APU,ACT}$ to the bus 22. In block 144, the algorithm returns to block 112, to repeat blocks 112 to 142 with continually-updated information regarding the battery state-of-charge and operator input 42 indicating the requested power, and a continually changing weighted average of past power requests.

While the best modes for carrying out the invention have been described in detail, those familiar with the art to which this invention relates will recognize various alternative designs and embodiments for practicing the invention within the scope of the appended claims.

The invention claimed is:

1. A method of managing electric power flow in a vehicle powertrain; wherein the powertrain includes an electric motor/generator operatively connected to an output member to provide tractive torque for propelling the vehicle, a battery operable to provide electric power to the electric motor/generator, an auxiliary power unit operable to provide electric power to the electric motor/generator, wherein the auxiliary power unit includes an engine and a generator powered by the combustion engine, the method comprising:

recording operator input indicative of a current request for electric power for propulsion;

determining an amount of the currently requested electric power for propulsion ($P_{REQ}$) corresponding with the recorded operator input;

averaging the determined amount of the currently requested electric power ($P_{REQ}$) with amounts of requested electric power based on previously recorded operator input recorded over time; and determining an amount of electric power required from the auxiliary power unit ($P_{APU,NOM}$) to satisfy the current request for electric power based at least in part on the averaged requested electric power for propulsion.

2. The method of claim 1, further comprising:

determining a state-of-charge of the battery; wherein the time over which the operator input is recorded is dependent on the state-of-charge of the battery.

3. The method of claim 1, further comprising:

determining a state-of-charge of the battery;

comparing the determined state-of-charge of the battery to a predetermined minimum state-of-charge; and wherein the determining an amount of electric power required from the auxiliary power unit ($P_{APU,NOM}$) occurs only if the determined state-of-charge of the battery is less than the predetermined minimum state-of-charge.

4. The method of claim 1, wherein the averaging includes weighting the recorded operator input by respective weighting factors ($w_i$) that decrease as time since the respective recordings increases.

5. The method of claim 1, further comprising:

calculating the amount of energy depleted from the battery ($E_{BATT,short}$) based at least in part on a sum of differences between respective amounts of electric power actually previously provided by the auxiliary power unit ($P_{APU,ACT}$) and the respective amounts of requested electric power;

selecting a predetermined effective peak power available ($P_{APU,EPL}$) from the auxiliary power unit based at least partially on the amount of energy depleted from the battery ($E_{BATT,short}$);

comparing the electric power required from the auxiliary power unit ($P_{APU,NOM}$) to the effective peak power available ($P_{APU,EPL}$) from the auxiliary power unit;

establishing a corrected power level ($P_{APU,corr}$); wherein the corrected power level is the selected effective peak power available from the auxiliary power unit ($P_{APU,EPL}$) if the electric power required from the auxiliary power unit ($P_{APU,NOM}$) is greater than the effective peak power available from the auxiliary power unit ($P_{APU,EPL}$); and an amount of power from the auxiliary power unit sufficient to provide both the electric power required from the auxiliary power unit ($P_{APU,NOM}$) and a predetermined amount of power for recharging the battery if the electric power required from the auxiliary power unit ($P_{APU,NOM}$) is less than the selected effective peak power available from the auxiliary power unit ($P_{APU,EPL}$).

6. The method of claim 5, further comprising:

comparing the corrected power level ($P_{APU,corr}$) to a predetermined efficiency-based power level ($P_{APU\ MIN-EFF}$); wherein the predetermined efficiency-based power level ($P_{APU\ MIN-EFF}$) is dependent upon physical characteristics of engine and the generator;

providing the corrected power level ($P_{APU,corr}$) to the electric motor/generator from the auxiliary power unit if the corrected power level ($P_{APU,corr}$) is not less than the predetermined efficiency-based power level ($P_{APU\ MIN-EFF}$); and providing the predetermined efficiency based power level ($P_{APU\ MIN-EFF}$) if the corrected power level ($P_{APU,corr}$) is less than the predetermined efficiency-based power level ($P_{APU\ MIN-EFF}$) and only if the amount of energy depleted from the battery ($E_{BATT,short}$) is greater than a predetermined amount of energy ($E_{1,threshold}$).

7. The method of claim 6, wherein the predetermined amount of power for recharging the battery is equal to a difference between the selected effective peak power available from the auxiliary power unit ($P_{APU,EPL}$) and the electric power required from the auxiliary power unit ($P_{APU,NOM}$) multiplied by a factor ($K_{corr}$) that varies based on the amount of energy depleted from the battery ($E_{BATT,short}$).

8. The method of claim 1, wherein torque is provided to the output member only via the electric motor/generator.

9. A method of managing electric power flow in a vehicle powertrain comprising:

providing power at an output member sufficient to satisfy a propulsion request of a vehicle operator; wherein the power is provided by an electric motor/generator operatively connected to the output member;

wherein a portion of the power is provided to the electric motor/generator by an auxiliary power unit to supplement power provided by a battery; wherein the power provided by the auxiliary power unit ($P_{APU,ACT}$) is based at least in part on a weighted average of previous propulsion requests of the vehicle operator;

predetermined efficiency characteristics of the auxiliary power unit; and an amount of energy depleted from the battery ($E_{BATT,short}$);

wherein the auxiliary power unit includes a combustion engine and a generator powered by the combustion engine; wherein the generator provides electrical power to the electric motor/generator; and wherein the engine is operatively connected to the output member and the electric motor/generator only via the generator.

10. The method of claim 9, wherein the weighted average of previous propulsion requests is calculated using a number of previous propulsion requests that varies based on a state-of-charge of the battery.

11. The method of claim 9, wherein the weighted average of previous propulsion requests is calculated by applying respective weighting factors ($w_i$) to the previous propulsion requests that decrease as time since the respective previous propulsion requests increases.

12. A powertrain for a vehicle comprising:

an output member;

an electric motor/generator operatively connected to the output member to provide power to the output member for propelling the vehicle;

a battery operable to provide electric power to the electric motor/generator;

an auxiliary power unit operable to supplement the battery by providing electric power to the electric motor/generator; wherein the auxiliary power unit includes an engine and a generator powered by the engine;

a processor that records operator input indicative of a current request for electric power for propulsion;

determines an amount of energy depleted from the battery ($E_{BATT,short}$); and executes an algorithm that calculates an amount of the currently requested electric power for propulsion based on the operator input;

averages the amount of the currently requested electric power for propulsion with previously calculated amounts of electric power based on previously recorded operator input indicative of previous requests for electric power for propulsion occurring over time; and determines an amount of electric power required from the auxiliary power unit ($P_{APU,NOM}$) to meet the currently requested electric power for propulsion based at least in part on the averaged amount of requested electric power for propulsion and the amount of energy depleted from the battery ($E_{BATT,short}$).

13. The powertrain of claim 12, wherein the algorithm determines an amount of electric power to be provided by the auxiliary power unit ($P_{APU,ACT}$) based on a comparison of the amount of electric power required from the auxiliary power unit ($P_{APU,NOM}$) and an effective peak power available ($P_{APU,EPL}$) from the auxiliary power unit; wherein the effective peak power available ($P_{APU,EPL}$) from the auxiliary power unit increases as the amount of energy depleted ($E_{BATT,short}$) increases.

14. The powertrain of claim 13, wherein the algorithm establishes a corrected power level ($P_{APU,corr}$); wherein the corrected power level is:

the effective peak power available from the auxiliary power unit ($P_{APU,EPL}$) if the electric power required from the auxiliary power unit ($P_{APU,NOM}$) is greater than the effective peak power available from the auxiliary power unit ($P_{APU,EPL}$); and an amount of power from the auxiliary power unit sufficient to provide both the electric power required from the auxiliary power unit ($P_{APU,NOM}$) and a predetermined amount of power for recharging the battery if the electric power required from the auxiliary power unit ($P_{APU,NOM}$) is less than the selected effective peak power available from the auxiliary power unit ($P_{APU,EPL}$).

15. The powertrain of claim 14, wherein the algorithm:
compares the corrected power level ($P_{APU,corr}$) to a predetermined efficiency-based power level ($P_{APU\ MIN-EFF}$); wherein the predetermined efficiency-based power level ($P_{APU\ MIN-EFF}$) is dependent upon physical characteristics of the engine and the generator;
provides the corrected power level ($P_{APU,corr}$) to the electric motor/generator from the auxiliary power unit if the corrected power level ($P_{APU,corr}$) is not less than the predetermined efficiency-based power level ($P_{APU\ MIN-EFF}$); and
provides the predetermined efficiency based power level ($P_{APU\ MIN-EFF}$) if the corrected power level ($P_{APU,corr}$) is less than the predetermined efficiency-based power level ($P_{APU\ MIN-EFF}$) and only if the amount of energy depleted from the battery ($E_{BATT,short}$) is greater than a predetermined amount of energy ($E_{1,threshold}$).

* * * * *